United States Patent
Mo

(10) Patent No.: US 9,316,876 B2
(45) Date of Patent: Apr. 19, 2016

(54) ALIGNING VOLTAGE APPLYING DEVICE AND METHOD FOR APPLYING ALIGNING VOLTAGE

(75) Inventor: Shengpeng Mo, Shenzhen (CN)

(73) Assignee: SHENZHEN CHINA STAR OPTOELECTRONICS TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 13/641,129

(22) PCT Filed: Apr. 26, 2012

(86) PCT No.: PCT/CN2012/074730
§ 371 (c)(1),
(2), (4) Date: Oct. 15, 2012

(87) PCT Pub. No.: WO2013/159305
PCT Pub. Date: Oct. 31, 2013

(65) Prior Publication Data
US 2015/0044931 A1    Feb. 12, 2015

(30) Foreign Application Priority Data

Apr. 24, 2012  (CN) .......................... 2012 1 0123309

(51) Int. Cl.
| G01R 31/00 | (2006.01) |
| G02F 1/1345 | (2006.01) |
| G02F 1/1337 | (2006.01) |
| G02F 1/13 | (2006.01) |
| G02F 1/139 | (2006.01) |
| G02F 1/137 | (2006.01) |

(52) U.S. Cl.
CPC .......... *G02F 1/13458* (2013.01); *G02F 1/1303* (2013.01); *G02F 1/1393* (2013.01); *G02F 1/133788* (2013.01); *G02F 2001/13775* (2013.01); *G02F 2001/133726* (2013.01)

(58) Field of Classification Search
None
See application file for complete search history.

(56) References Cited

U.S. PATENT DOCUMENTS

| 7,716,818 B2 * | 5/2010 | Tsuji | .................. H05K 13/0061 269/21 |
| 7,850,815 B2 * | 12/2010 | Kaizu | ................. B32B 37/0046 156/104 |
| 2001/0019276 A1 * | 9/2001 | Yoshida | ............. G01R 1/07342 324/755.01 |
| 2002/0157246 A1 * | 10/2002 | Ogimoto | ............ H05K 13/0069 29/832 |
| 2006/0265851 A1 * | 11/2006 | Inaoka | ................. B41J 2/14233 29/434 |
| 2010/0264115 A1 * | 10/2010 | Kawamura | .......... C23C 16/4585 216/67 |

FOREIGN PATENT DOCUMENTS

JP    1995013176 A    *    1/1995

OTHER PUBLICATIONS

Machine English translation of Japanese Patent Application Publication to Inventor Wakita Hisahide, JP H7-013176 A, Jan. 17, 2015. Translation description created on Aug. 18, 2015.*

* cited by examiner

*Primary Examiner* — Benjamin M Baldridge
(74) *Attorney, Agent, or Firm* — Mark M. Friedman

(57) ABSTRACT

The present invention relates an aligning voltage applying device and a method for applying an aligning voltage. The aligning voltage applying device includes a base, probe pins, and a pressing plate module. The pressing plate module includes a pressing plate and a driving unit. The aligning voltage applying device and the method for applying the aligning voltage of the present invention can make the probe pins contact pads effectively without damage to the probe pins and an LCD substrate.

16 Claims, 4 Drawing Sheets

ALIGNING VOLTAGE APPLYING DEVICE AND METHOD FOR APPLYING ALIGNING VOLTAGE

FIELD OF THE INVENTION

The present invention relates to a liquid crystal technology, and especially to an aligning voltage applying device for effectively applying an aligning voltage to a liquid crystal display (LCD) substrate needing a photo alignment and a method for applying aligning voltage.

BACKGROUND OF THE INVENTION

Performance requirements of the market for an LCD panel are toward characteristics of high contrast ratio, no gray scale inversion, little color shift, high luminance, high chroma, high color saturation, high response, wide viewing angle, and so on. At present, technical solutions that are capable of achieving the demand of the wide viewing angle have adding a wide viewing film to twist nematic (TN) liquid crystals, an in-plane switching (IPS) LCD panel, a fringe field switching (FFS) LCD panel, a multi-domain vertically alignment (MVA) LCD panel, and so on.

The MVA LCD panel herein has a most remarkable effect of the wide viewing angle. However, title directions of the LC molecules, which are around alignment protrusions and alignment slits of the MVA LCD panel, are often uncertain, resulting in a light leakage situation for causing a contrast of a display of the LCD panel to decrease. If a light shield layer corresponding to the alignment protrusions or the alignment slits is disposed for shielding the leaked light, an aperture ratio of the display will be limited. Thus, display luminance of the LCD panel still can not be raised.

As a result, a polymer-stabilized alignment (PSA) method, which forms multiple aligning directions, has been proposed to improve the drawback of the poor contrast of the MVA LCD panel.

The PSA method adopts reactive monomers to blend into an LC layer firstly and applies a predetermined voltage thereto. The LC layer is irradiated by an ultraviolet (UV) light under the voltage. The reactive monomers are then polymerized and cured to form a polymer layer simultaneously on opposite sides of substrates beside the LC layer.

The aligning voltage applying device is widely used in an UV exposure apparatus and an inspector after the alignment process. The aligning voltage is applied to the corresponding LC layer through probe pins of the aligning voltage applying device and pads of the LCD substrate. As shown in FIG. 1 and FIG. 2, FIG. 1 is a top view schematically illustrating an aligning voltage applying device in the prior art, and FIG. 2 is a cross-sectional view along A-A' in FIG. 1. The LCD substrate is designated at 10, and the aligning voltage applying device is designated at 20. The aligning voltage applying device 20 is disposed around four edges of the LCD substrate 10, in which a base is designated at 21, and the probe pins that are disposed on the base 21 is designated at 22. The base 21 is raised through a motor, so that the probe pin 22 contact pads (not shown) which are disposed on the edges of the LCD substrate 10 for applying the aligning voltage. However, the edges of the LCD substrate 10 are easily deformed and bent (as shown at B area in FIG. 2) due to fabrication, thus resulting a contact miss between the probe pins 22 and the pads, such that the alignment of the LCD substrate 10 after exposing the UV light is poor.

At present, this problem can be avoided just by fine tuning the probe pin 22 to elevate manually, but the probe pins 22 may contact the pads too heavily if the probe pins 22 are excessively elevated. It may cause damage to the probe pins 22 and the LCD substrate 10.

Therefore, there is a significant need to provide an aligning voltage applying device and a method for applying aligning voltage to solve the problems existing in the prior art.

SUMMARY OF THE INVENTION

An objective of the present invention is to provide an aligning voltage applying device equipped with a pressing plate and a corresponding method for applying the aligning voltage. The pressing plate presses an LCD substrate for making probe pins effectively contact pads without damage to the probe pins and the LCD substrate, so as to solve the technical problem that the conventional aligning voltage applying device easily causes the damage to the probe pins and the LCD substrate due to the bending of the LCD substrate.

To achieve the foregoing objective, the technical solution of this invention is implemented as follows.

The present invention relates an aligning voltage applying device, which includes: a base; a probe pin disposed on the base for contacting a corresponding pad; and a pressing plate module utilized to press an edge of a corresponding LCD substrate. The pressing plate module includes: a pressing plate disposed opposite the probe pin; and a driving unit utilized to drive the pressing plate to move relative to the probe pin. The pressing plate has an effective width between 12.5 to 20 millimeters, and the effective width of the pressing plate is a width of a contact area therebetween after the pressing plate presses the LCD substrate. A length of the pressing plate is between 15 millimeters and 20 millimeters.

The present invention further relates an aligning voltage applying device, which includes a base; a probe pin disposed on the base for contacting a corresponding pad; and a pressing plate module utilized to press an edge of a corresponding LCD substrate. The pressing plate module includes: a pressing plate disposed opposite the probe pin; and a driving unit utilized to drive the pressing plate to move relative to the probe pin.

In the aligning voltage applying device of the present invention, the pressing plate has an effective width between 12.5 to 20 millimeters, and the effective width of the pressing plate is a width of a contact area therebetween after the pressing plate presses the LCD substrate.

In the aligning voltage applying device of the present invention, a length of the pressing plate is between 15 millimeters and 20 millimeters.

In the aligning voltage applying device of the present invention, the driving unit includes: a driving motor; and a drive shaft controlled by the driving motor, and coupled to the pressing plate for driving the pressing plate to move relative to the probe pin.

In the aligning voltage applying device of the present invention, the aligning voltage applying device further comprises: a calibration module utilized to detect a bending degree of the edge of the LCD substrate.

In the aligning voltage applying device of the present invention, the calibration module is a pressure detecting module which is utilized to detect pressures of multiple points on the pressing plate.

In the aligning voltage applying device of the present invention, the calibration module is a step profiler which is utilized to detect the bending degree of the edge of the LCD substrate.

The present invention further relates a method for applying an aligning voltage by using the aligning voltage applying device, which includes a base, a probe pin disposed on the base, and a pressing plate module, wherein the pressing plate module comprises a pressing plate and a driving unit. The method for applying aligning voltage comprising: A, driving the base to make the probe pin contact a pad of an LCD substrate; B, driving the pressing plate to press an edge of the LCD substrate by the driving unit for making the edge of the LCD substrate flat; C, applying the aligning voltage to the pad by the probe pin.

In the method for applying aligning voltage of the present invention, before the step A, the method further includes the step of: A1, measuring a bending degree of the edge of the LCD substrate; and the step B specifically includes: according to a result of the measurement in the step A1, driving the pressing plate to press the edge of the LCD substrate by the driving unit for making the edge of the LCD substrate flat.

In the method for applying aligning voltage of the present invention, the pressing plate has an effective width between 12.5 to 20 millimeters, and the effective width of the pressing plate is a width of a contact area therebetween after the pressing plate presses the LCD substrate.

In the method for applying aligning voltage of the present invention, a length of the pressing plate is between 15 millimeters and 20 millimeters.

In the method for applying aligning voltage of the present invention, the driving unit comprises: a driving motor; and a drive shaft controlled by the driving motor, and coupled to the pressing plate for driving the pressing plate to move relative to the probe pin.

In the method for applying aligning voltage of the present invention, the aligning voltage applying device further includes a calibration module, and the step A1 specifically includes measuring the bending degree of the edge of the LCD substrate by using the calibration module.

In the method for applying aligning voltage of the present invention, the calibration module is a pressure detecting module which is utilized to detect pressures of multiple points on the pressing plate.

In the method for applying aligning voltage of the present invention, the calibration module is a step profiler which is utilized to detect the bending degree of the edge of the LCD substrate.

In comparison with the conventional aligning voltage applying device and the method for applying aligning voltage, the aligning voltage applying device of the present invention is equipped with the pressing plate. The pressing plate exerts pressure on the LCD substrate for making the probe pins effectively contact the pads without damage to the probe pins and the LCD substrate, so as to solve the technical problem that the conventional aligning voltage applying device easily causes the damage of the probe pins and the LCD substrate due to the bending of the LCD substrate.

It is to be understood that both the foregoing general description and the following detailed description of the present invention are exemplary and explanatory and are intended to provide further explanation of the invention as claimed.

DETAILED DESCRIPTION OF THE PREFERRED EMBODIMENTS

Figure 1:
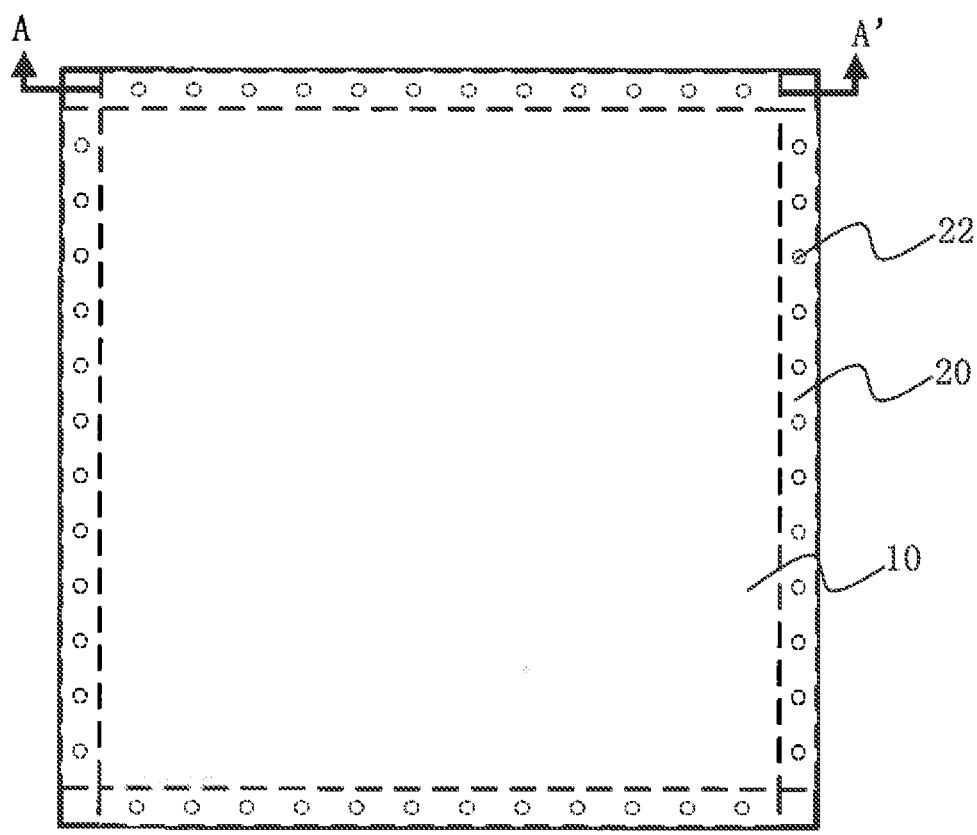
FIG. 1 is a top view schematically illustrating an aligning voltage applying device in the prior art.
Figure 2:
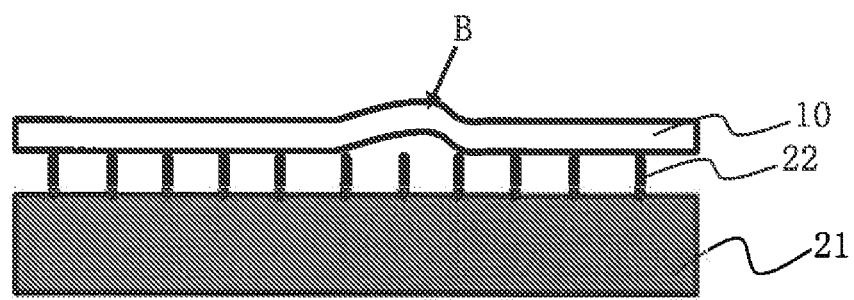
FIG. 2 is a cross-sectional view along A-A' in FIG. 1.

Descriptions of the following embodiments refer to attached drawings which are utilized to exemplify specific embodiments. Directional terms mentioned in the present invention, such as "top" and "down", "front", "rear", "left", "right", "inside", "outside", "side" and so on are only directions with respect to the attached drawings. Therefore, the used directional terms are utilized to explain and understand the present invention but not or limit the present invention.

In different drawings, the same reference numerals refer to like parts throughout the drawings.

Figure 3A:
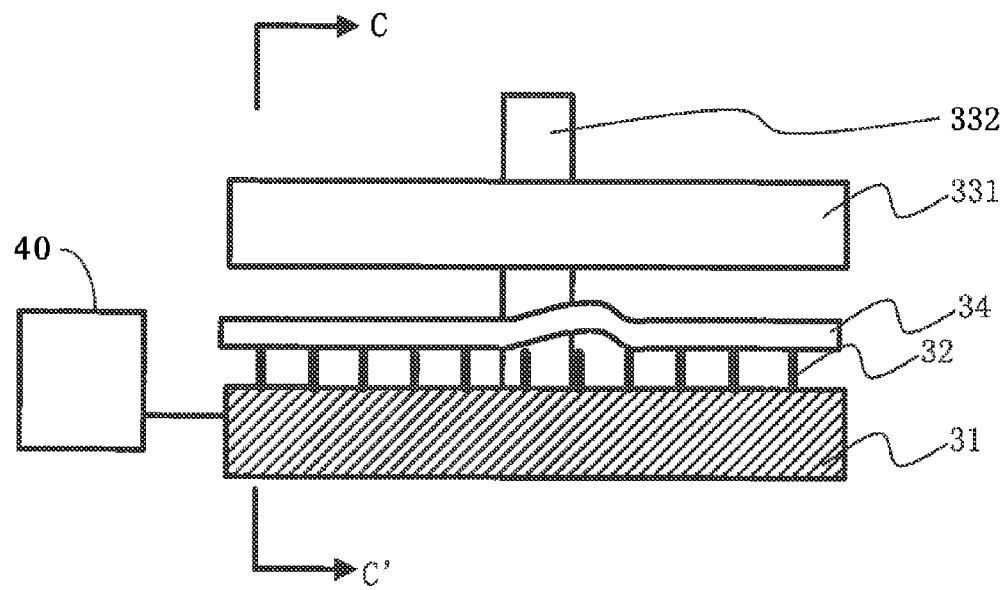
FIG. 3A is a schematic drawing illustrating a pressing plate of an aligning voltage applying device of the present invention before exerting pressure.
Figure 3B:
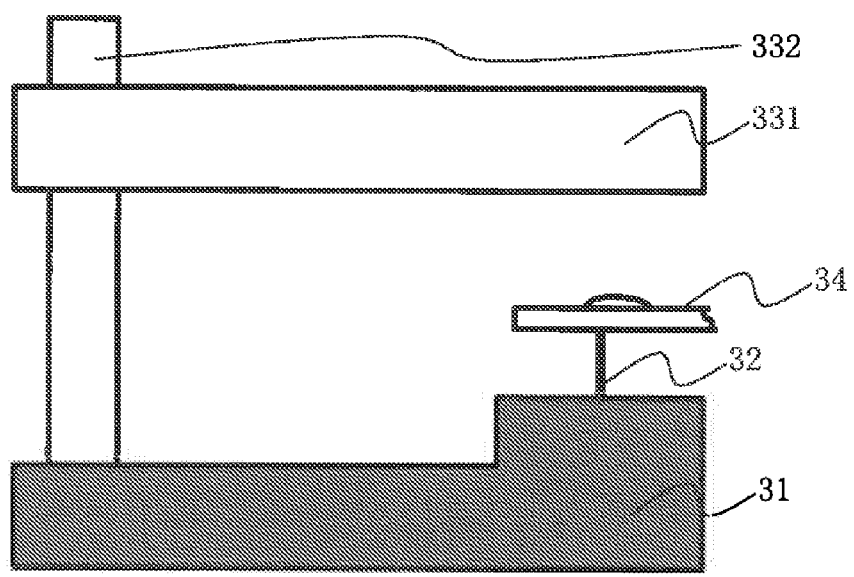
FIG. 3B is a cross-sectional view along C-C' in FIG. 3A.

Referring to FIG. 3A and FIG. 3B, FIG. 3A is a schematic drawing illustrating a pressing plate of an aligning voltage applying device of the present invention before exerting pressure, and FIG. 3B is a cross-sectional view along C-C' in FIG. 3A. The aligning voltage applying device includes a base 31, probe pins 32 and a pressing plate module, The probe pins 32 are disposed on the base 31 for contacting corresponding pads of the LCD substrate 34. The pressing plate module includes a pressing plate 331 and a driving unit. The pressing plate 331 is disposed opposite to the probe pin 32 (above the probe pins 32 in the drawing), and utilized to exert pressure on edges of the corresponding LCD substrate 34. The driving unit is utilized to drive the pressing plate 331 to move relative to the probe pins 32 (move up and down relative to the probe pins 32). Because the edges of the LCD substrate 34 are generally thinner (extending length of thinner portion is generally less than 12.5 millimeters), an effective width of the pressing plate 331 is set between 12.5 millimeters to 20 millimeters. Thus it can be assured that the thinner portion on the edges of the LCD substrate can be covered after the pressing plate 331 exerts pressure. The effective width of the pressing plate 331 is a width of contact area between the pressing plate 331 and the LCD substrate 34 after the pressing plate 331 exerts pressure on the LCD substrate. Meanwhile, a length of the pressing plate 311 is generally between 15 millimeters and 20 millimeters, so that the bending of the LCD substrate 34 can be effectively reduced or eliminated when the pressing plate 331 exerts pressure.

The driving unit of aligning voltage applying device of the present invention includes a driving motor (not shown) and a drive shaft 332. The drive shaft 332 is controlled by the driving motor, and coupled to the pressing plate 331 for driving the pressing plate 331 to move relative to the probe pins 32 (move up and down relative to the probe pins 32). When the pressing plate 331 is located at a top stop, the pressing plate 331 dose not contact the LCD substrate 34 and is far away from the probe pin 32. When the pressing plate 331 is located at a bottom stop, the pressing plate 331 contacts and presses the LCD substrate 34 for reducing or eliminating the bending of the LCD substrate 34.

Figure 4A:
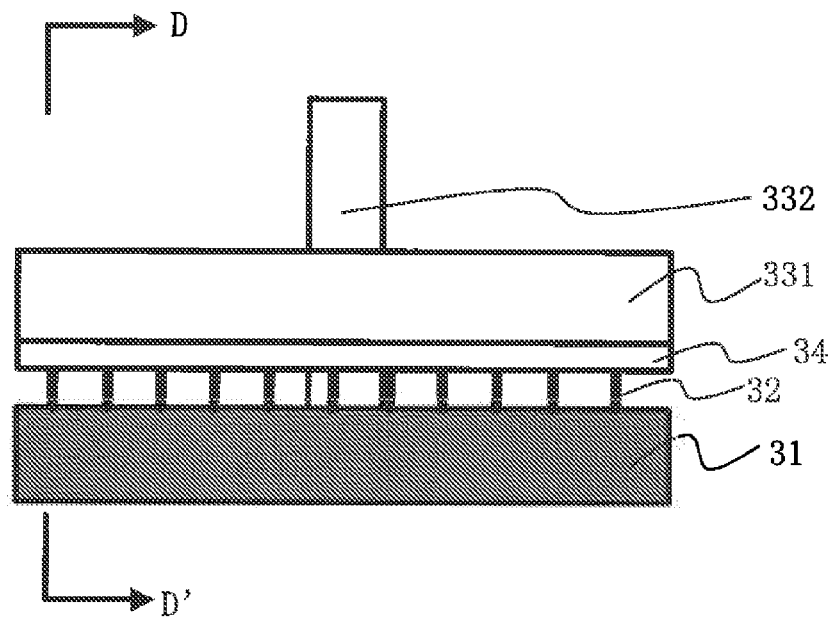
FIG. 4A is a schematic drawing illustrating a pressing plate of an aligning voltage applying device of the present invention after exerting pressure.
Figure 4B:
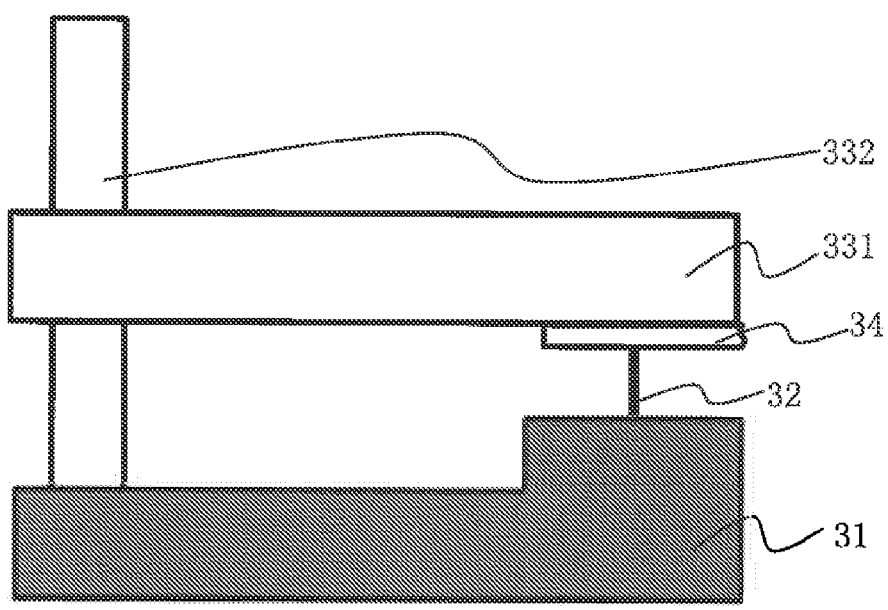
FIG. 4B is a cross-sectional view along D-D' in FIG. 4A.

Referring to FIGS. 3A, 3B, 4A and 4B, FIG. 4A is a schematic drawing illustrating a pressing plate of an aligning voltage applying device of the present invention after exerting pressure, and FIG. 4B is a cross-sectional view along D-D' in FIG. 4A. When using the aligning voltage applying device of the present invention, the edge of the LCD substrate 34 extends into the space between the probe pin 32 and the pressing plate 331 first, and then the base 31 is driven to make the probe pins 32 contact the pads of the LCD substrate 34, as shown in FIG. 3A and FIG. 3B. The driving unit drives the pressing plate 331 to exert pressure on the edge of the LCD substrate 34 (the movement of up and down of the pressing plate 331 is realized by the driving motor controlling the drive shaft 332), so as to flat the edge of the LCD substrate 34. Thus, it ensures stable and reliable contact between the probe pins 32 and the LCD substrate 34, as shown in FIG. 4A and FIG. 4B. Finally, the probe pin 32 applies the aligning voltage on the pads of the LCD substrate 34.

The aligning voltage applying device of the present invention may further include a calibration module 40. The calibration module 40 is utilized to detect a bending degree of the edge of the LCD substrate 34. The calibration module 40 can be a pressure detecting module or step profiler. If the calibration module 40 is the pressure detecting module, pressures of multiple points on the pressing plate 331 can be measured when the pressing plate 331 presses the edge of LCD substrate 34, for determining whether or not the pressures are even, so as to determine or not the pressing plate 331 is at the right place for pressing. If the calibration module 40 is the step profiler, the bending degree (i.e. surface morphology) of the edge of the LCD substrate 34 can be inspected before the pressing plate 331 exerts pressure on the edge of the LCD substrate 34. If the bending degree is less than a predetermined value, it shows that the bending degree of the LCD substrate 34 dose not influence the applying voltage process of the aligning voltage applying device, without using the pressing plate 331 to exert pressure. If the bending degree is larger than the predetermined value, the pressing plate 331 needs to be utilized to exert pressure to reduce or eliminate the bending of the LCD substrate 34.

Figure 5:
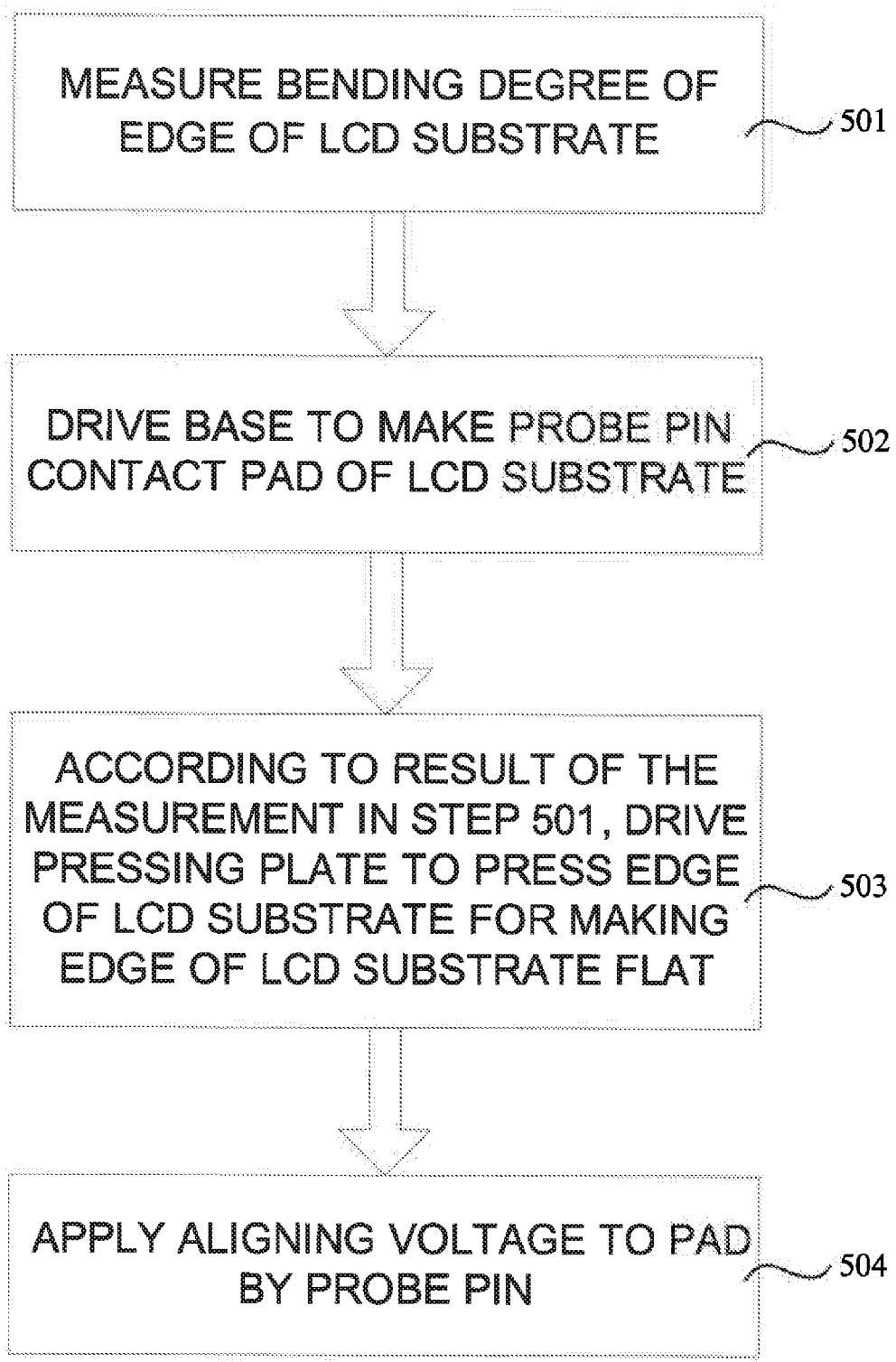
FIG. 5 is a flow chart illustrating a method for applying aligning voltage according to a preferred embodiment of the present invention.

The present invention further relates a method for applying aligning voltage according the aligning voltage applying device, as shown in FIG. 5. FIG. 5 is a flow chart illustrating a method for applying aligning voltage according to a preferred embodiment of the present invention. The aligning voltage applying device includes a base, probe pins disposed on the base, and a pressing plate module. The pressing plate module includes a pressing plate and a driving unit, in which the pressing plate is disposed above the probe pin and utilized to exert pressure on edges of the corresponding LCD substrate. The driving unit is utilized to drive the pressing plate to move up and down relative to the probe pin. The method for applying aligning voltage of the present invention includes: step 501, measuring a bending degree of the edge of the LCD substrate; step 502, driving the base to make probe pins contact the pads of the LCD substrate; step 503, according to a result of the measurement in the step 501, driving the pressing plate to press the edge of the LCD substrate by the driving unit for making the edge of the LCD substrate flat; step 504, applying the aligning voltage to the pad by the probe pin. The method ends at the step 504.

Because the edges of the LCD substrate are generally thinner, an effective width of the pressing plate is set between 12.5 millimeters to 20 millimeters. Thus it can be assured that the thinner portion on the edges of the LCD substrate can be covered after the pressing plate exerts pressure. The effective width of the pressing plate is a width of contact area between the pressing plate and the LCD substrate after the pressing plate presses the LCD substrate. Meanwhile, a length of the pressing plate 311 is generally between 15 millimeters and 20 millimeters, so that the bending of the LCD substrate can be effectively reduced or eliminated when the pressing plate exerts pressure. An order of steps 502 and 503 herein also can be exchanged, and the corresponding technical problem also can be solved after the exchange for achieving the same technical effect.

The specific steps of the method for applying aligning voltage of the present invention are the same or similar to the usage of the above-mentioned specific embodiment of said aligning voltage applying device. Specific description can refer to the specific embodiment of said aligning voltage applying device.

The aligning voltage applying device and the method of the present invention are equipped with the pressing plate. The pressing plate presses an LCD substrate for making probe pins effectively contact pads without damage to the probe pins and the LCD substrate, so as to solve the technical problem that the conventional aligning voltage applying device easily causes the damage of the probe pins and the LCD substrate due to the bending of the LCD substrate.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. An aligning voltage applying device, comprising:
a base;
a probe pin disposed on the base for contacting a corresponding pad; and
a pressing plate module utilized to press an edge of a corresponding liquid crystal display (LCD) substrate, the pressing plate module comprising:
a pressing plate disposed opposite the probe pin such that the edge of the LCD substrate is located between the pressing plate and the probe pin; and
a driving unit utilized to drive the pressing plate to move relative to the probe pin;
the pressing plate having an effective width between 12.5 millimeters to 20 millimeters, and the effective width of the pressing plate being a width of a contact area therebetween after the pressing plate presses the LCD substrate;
a length of the pressing plate being between 15 millimeters and 20 millimeters.

2. An aligning voltage applying device, comprising:
a base;
a probe pin disposed on the base for contacting a pad of a corresponding LCD substrate; and
a pressing plate module utilized to press an edge of a corresponding LCD substrate, the pressing plate module comprising:
a pressing plate disposed opposite the probe pin such that the edge of the LCD substrate is located between the pressing plate and the probe pin; and
a driving unit utilized to drive the pressing plate to move relative to the probe pin.

3. The aligning voltage applying device according to claim 2, wherein the pressing plate has an effective width between 12.5 millimeters to 20 millimeters, and the effective width of the pressing plate is a width of a contact area therebetween after the pressing plate presses the LCD substrate.

4. The aligning voltage applying device according to claim 2, wherein a length of the pressing plate is between 15 millimeters and 20 millimeters.

5. The aligning voltage applying device according to claim 2, wherein the driving unit comprises:
   a driving motor; and
   a drive shaft controlled by the driving motor, and coupled to the pressing plate for driving the pressing plate to move relative to the probe pin.

6. The aligning voltage applying device according to claim 2, wherein the aligning voltage applying device further comprises:
   a calibration module utilized to detect a bending degree of the edge of the LCD substrate.

7. The aligning voltage applying device according to claim 6, wherein the calibration module is a pressure detecting module which is utilized to detect pressures of multiple points on the pressing plate.

8. The aligning voltage applying device according to claim 6, wherein the calibration module is a step profiler which is utilized to detect the bending degree of the edge of the LCD substrate.

9. A method for applying an aligning voltage, using an aligning voltage applying device which comprises a base, a probe pin disposed on the base, and a pressing plate module, wherein the pressing plate module comprises a pressing plate and a driving unit; the method for applying aligning voltage comprising:
   A, driving the base to make the probe pin contact a pad of an LCD substrate;
   B, driving the pressing plate to press an edge of the LCD substrate by the driving unit such that the edge of the LCD substrate is located between the pressing plate and the probe pin for making the edge of the LCD substrate flat; and
   C, applying the aligning voltage to the pad by the probe pin.

10. The method according to claim 9, wherein before the step A, the method further comprises the step of:
    A1, measuring a bending degree of the edge of the LCD substrate;
    the step B comprising:
    according to a result of the measurement in the step A1, driving the pressing plate to press the edge of the LCD substrate by the driving unit for making the edge of the LCD substrate flat.

11. The method according to claim 9, wherein the pressing plate has an effective width between 12.5 to 20 millimeters, and the effective width of the pressing plate is a width of a contact area therebetween after the pressing plate presses the LCD substrate.

12. The method according to claim 9, wherein a length of the pressing plate is between 15 millimeters and 20 millimeters.

13. The method according to claim 9, wherein the driving unit comprises:
    a driving motor; and
    a drive shaft controlled by the driving motor, and coupled to the pressing plate for driving the pressing plate to move relative to the probe pin.

14. The method according to claim 10, wherein the aligning voltage applying device further comprises a calibration module, and the step A1 specifically comprises measuring the bending degree of the edge of the LCD substrate by using the calibration module.

15. The method according to claim 14, wherein the calibration module is a pressure detecting module which is utilized to detect pressures of multiple points on the pressing plate.

16. The method according to claim 14, wherein the calibration module is a step profiler which is utilized to detect the bending degree of the edge of the LCD substrate.

* * * * *